Figure 1:
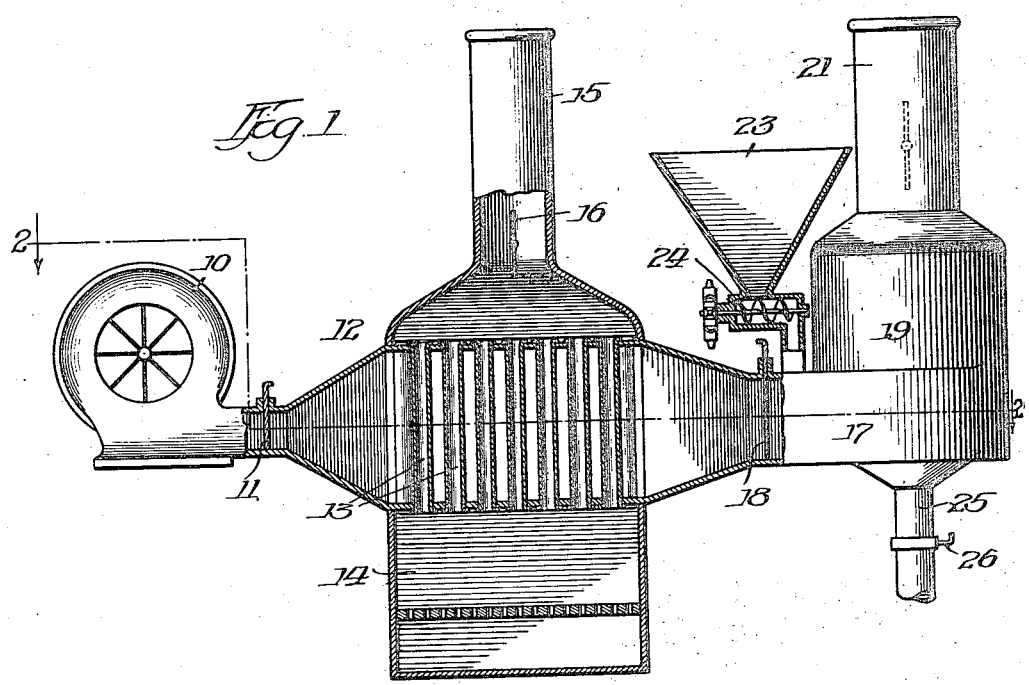

J. C. DAVIS, F. C. HENKE & W. H. HAWLEY.
APPARATUS FOR DRYING SAND.
APPLICATION FILED FEB. 17, 1915.

1,151,667.

Patented Aug. 31, 1915.

Witnesses:

Inventors:
James C. Davis
Fred C. Henke
William H. Hawley

UNITED STATES PATENT OFFICE.

JAMES C. DAVIS, OF HINSDALE, FRED C. HENKE, OF EAST ST. LOUIS, AND WILLIAM H. HAWLEY, OF GRANITE CITY, ILLINOIS, ASSIGNORS TO AMERICAN STEEL FOUNDRIES, OF NEW YORK, N. Y., A CORPORATION OF NEW JERSEY.

APPARATUS FOR DRYING SAND.

1,151,667.  Specification of Letters Patent.  Patented Aug. 31, 1915.

Application filed February 17, 1915.  Serial No. 8,733.

*To all whom it may concern:*

Be it known that we, JAMES C. DAVIS, of Hinsdale, Dupage county, Illinois; FRED C. HENKE, of East St. Louis, St. Clair county, Illinois, and WILLIAM H. HAWLEY, of Granite City, Madison county, Illinois, citizens of the United States, have invented certain new and useful Improvements in Apparatus for Drying Sand, of which the following is a specification.

This invention relates to a new and novel method of and apparatus for drying or heating sand or other similar materials.

The object of this invention has been to provide a machine for drying or heating purposes which would be simple and economical in construction and operation, easily adjusted to cover a wide range of conditions and particularly adapted to drying molding sand.

Molding sand has hitherto been dried by stationary contact with a heated surface or by contact with heated air containing the products of combustion. Neither of these methods is economical or satisfactory because the stationary sand in contact with a heated surface is not dried uniformly for the reason that the grains of sand closely in contact with the surface are heated to a temperature which may be deleterious to its fitness for molding purposes. Molding sand contains a certain amount of natural or artificial bonding materials which are necessary for its purpose and these ingredients can easily be heated to a point which may seriously effect the quality of the sand. When heated by direct contact with hot gases and products of combustion, a similar condition exists with a further disadvantage that the material may be discolored and otherwise affected by being impregnated with a certain amount of foreign material such as ash, cinder, soot and other products of combustion. Molding sand which has been dried under the conditions described, is not only inferior but it may be even rendered entirely unfit for further use.

The main object of this invention is not only to dry molding sand but to accomplish this with absolute control of temperatures; to dry sand uniformly without contaminating it in any manner and to do so as economically as possible.

This invention may be said briefly, to consist of a drying chamber, wherein the drying process is carried out, which thoroughly agitates the sand and effects a very constant and thorough mixture and contact with the drying medium, which may be in the form of heated air, a heated surface or both when desired. Owing to the circular motion of the sand and its consequent centrifugal force, the sand is held in contact with the heating wall. The corrugations on this surface compel the sand to remain finely broken up and thereby secures for the process a very intimate mixture of sand with the heating or drying medium.

It will be understood, by reference to the drawings which accompany this specification, that the heating of the sand grains is accomplished both by radiation and convection. The advantage of the air blast is that it accomplishes several purposes; when heated it serves as a direct drying medium, it is responsible for the circular motion and the centrifugal force which imposes a thorough mechanical agitation of the sand and it further serves as a medium to carry off the moisture which has been evaporated by the heating process.

Another feature of this invention is the absolute control of the drying process and its economy in the consumption of fuel. It can be readily seen that by breaking up and agitating the sand, a thorough mixture and contact can be secured with the drying medium as each grain of sand is heated or dried individually under the most favorable conditions.

While this invention is described as particularly adapted to the drying of molding sand, there is no intention to limit it to this material, as the process described and claimed can be applied with equally good result to other materials and commodities which require careful heating or drying in their use or manufacture.

This invention consists in combination and arrangement of parts, all substantially as illustrated, hereinafter described and as set forth in the claims which accompany this specification. For full comprehension of this invention, however, reference must be had to the accompanying drawings, in which similar reference characters indicate the same parts in the several views.

Figure 2:
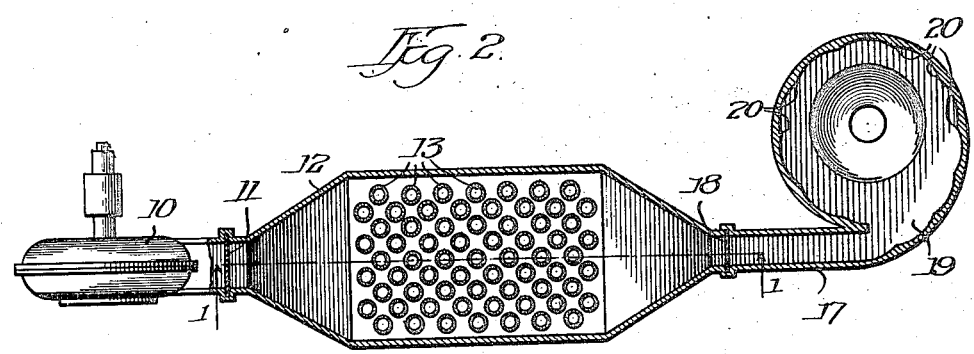

Figure 1 is a side elevation of one form of centrifugal drier with the air heating arrangements shown in section taken on the line 1—1 of Fig. 2, and Fig. 2 is a horizontal section taken on the line 2—2 of Fig. 1.

In the device as shown, a fan 10 creates a blast of air which is discharged under the influence of a regulating valve 11 into an expansion chamber 12. The enlarged cross-sectional area of the expansion chamber reduces the velocity of the air blast and thereby allows it sufficient time to become thoroughly heated by contact with fire flues or heating surfaces 13 located in the expansion chamber 12. The fire flues may be of any suitable size and number and preferably staggered to compel a positive and thorough contact of the air blast with the heating surface thus insuring high thermal efficiency with minimum fuel consumption. The fire flues 13 are heated by the outgoing hot gases from a combustion chamber or fire box 14 which may be arranged to suit any desired fuel. The fire flues discharge into a suitable stack 15, which may be provided with a damper 16 to regulate the draft.

With the construction shown, the air blast is preheated to any desired temperature and in no way contaminated by or with the products of combustion which originate from the heating arrangement.

After the air is preheated in its slow movement through the expansion chamber, its velocity is again increased by restricting the area of the outlet from the expansion chamber and is then carried by pipe 17 through a regulating valve 18 interposed therein, to the circular drying or heating chamber 19 which it enters at a point tangent to the circumference so as to create a circular or rotary motion. The wall of the drying chamber is provided with a number of corrugations 20 to agitate the sand and maintain it in a finely divided state, thereby greatly facilitating the drying process. The air blast, when it has given up considerable of its heat and has in turn become laden with moisture, is discharged from the drying chamber through an outlet 21, which is also equipped with regulating means so that the discharge of air can be controlled to suit conditions. Wet sand, or other material to be dried or heated, is placed in hopper 23 and forced, if necessary, direct into the drying chamber or through blast pipe 17 by means of a screw conveyer 24, or other positive feeding arrangement. The bottom of the drying or heating chamber 19 is provided with an outlet 25 and valve 26, so that the material dried or heated can be discharged when desired.

The drying or heating of material with this invention may be carried on either as a continuous or as a batch process, by respective control of the feeding arrangement, to suit the desire of the operator.

When the material to be dried or heated enters the drying or heating chamber it has immediately imparted thereto a circular movement which increases until the material reaches a velocity approximating that of the air blast. In consequence of this movement, a centrifugal force is established proportional to the velocity, and as a consequence the material is held firmly in contact with and compelled to travel against the vertical side wall of the heating chamber. Under this action and with the aid of the corrugations, the material undergoes a constant and continuous mechanical agitation which is instrumental in breaking it up into finely divided particles. In this condition the material is susceptible to the drying or heating action of the hot air blast or the heated surface of the drying chamber.

We claim:

1. In a drying device, the combination of means for heating and imparting motion to the body of air, means for combining a quantity of the material to be dried with the said blast of air, a drum having a tangential inlet through which said material is admitted, and means on the interior of said drum for finely dividing said material during its travel along said walls, substantially as described.

2. In a drying device, the combination of an air heating element, means for directing a blast of air through said element, means for supplying material to be dried to said blast of air, a drum having a tangential inlet through which said material is directed by said air blast, and means on the inner wall of said drum for finely dividing said material and causing intimate contact of all of the particles thereof with said heated air, substantially as described.

3. In a sand drying device, the combination of an air heating furnace, means for inducing a blast of air through and out of contact with the products of combustion of said furnace, means for combining the sand to be dried with said air blast, and a drum having interior projections and provided with a tangential inlet through which said sand is admitted, whereby said sand is, by centrifugal action, caused to engage with said projections and be finely divided thereby, substantially as described.

4. In a device of the class described, the combination of a furnace having a plurality of flues, a fan for inducing the passage of air through said furnace and in contact with said flues, a hopper for supplying sand to said blast of air, and a drum having a tangential inlet and provided with a plurality of interior corrugations, whereby the heated blast of air is caused to take up the material to be dried, and, by centrifugal action, to move the same in contact with the corrugated inner surface of the drum and thereby separate the particles from each other, substantially as described.

Signed at Chicago, Ill., this 13th day of February, 1915.

JAMES C. DAVIS.

Witnesses for James C. Davis:
JAMES SUTTIE,
F. A. LORENZ, Jr.

Signed at East St. Louis this 11th day of February, 1915.

FRED C. HENKE.
WILLIAM H. HAWLEY.

Witnesses for Fred C. Henke and William H. Hawley:
P. J. WARD,
L. McHENRY.